United States Patent
Crooks et al.

(10) Patent No.: US 9,994,489 B2
(45) Date of Patent: Jun. 12, 2018

(54) BONDING DISSIMILAR CERAMIC COMPONENTS

(71) Applicant: The Boeing Company, Chicago, IL (US)

(72) Inventors: Tab Hunter Crooks, Dana Point, CA (US); MaryAnn S. Muench, La Mirada, CA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 14/585,410

(22) Filed: Dec. 30, 2014

(65) Prior Publication Data

US 2016/0264478 A1 Sep. 15, 2016

(51) Int. Cl.
*B32B 18/00* (2006.01)
*B32B 7/02* (2006.01)
(Continued)

(52) U.S. Cl.
CPC .............. *C04B 37/005* (2013.01); *B32B 7/02* (2013.01); *B32B 7/12* (2013.01); *B32B 18/00* (2013.01); *C04B 35/638* (2013.01); *C04B 35/6365* (2013.01); *C04B 37/008* (2013.01); *C04B 37/025* (2013.01); *C04B 37/028* (2013.01); *C04B 37/04* (2013.01); *C09J 1/00* (2013.01); *B32B 2307/30* (2013.01); *C04B 2235/5436* (2013.01); *C04B 2235/656* (2013.01); *C04B 2235/9607* (2013.01); *C04B 2237/06* (2013.01); *C04B 2237/10* (2013.01); *C04B 2237/343* (2013.01); *C04B 2237/38* (2013.01);

(Continued)

(58) Field of Classification Search
None
See application file for complete search history.

(56) References Cited

U.S. PATENT DOCUMENTS 4,010,048 A   3/1977   Tesk et al.
4,595,662 A   6/1986   Mochida et al.
(Continued)

FOREIGN PATENT DOCUMENTS

EP   2716618 A1   4/2014

OTHER PUBLICATIONS

Ingamells, C.O., "Lithium Metaborate Flux in Silcate Analysis", Analytica Chimica Acta, vol. 52, No. 2., Nov. 1, 1970, pp. 232-334.
(Continued)

*Primary Examiner* — Colin W. Slifka
(74) *Attorney, Agent, or Firm* — McDonnell Boehnen Hulbert & Berghoff LLP

(57) ABSTRACT

Adhesive compositions and methods for bonding materials with different thermal expansion coefficients is provided. The adhesive is formulated using a flux material, a low flux material, and a filler material, where the filler material comprises particulate from at least one of the two components being bonded together. A thickening agent can also be used as part of the adhesive composition to aid in applying the adhesive and establishing a desired bond thickness. The method of forming a high strength bond using the disclosed adhesive does not require the use of intermediary layer or the use of high cure temperatures that could damage one or both of the components being bonded together.

12 Claims, 1 Drawing Sheet

(51) Int. Cl.
  *B32B 7/12* (2006.01)
  *C04B 37/00* (2006.01)
  *C09J 1/00* (2006.01)
  *C04B 35/636* (2006.01)
  *C04B 35/638* (2006.01)
  *C04B 37/02* (2006.01)
  *C04B 37/04* (2006.01)

(52) U.S. Cl.
  CPC .. *C04B 2237/385* (2013.01); *C04B 2237/401* (2013.01); *C04B 2237/52* (2013.01); *C04B 2237/58* (2013.01); *C04B 2237/60* (2013.01); *C04B 2237/708* (2013.01); *C04B 2237/72* (2013.01)

(56) References Cited

U.S. PATENT DOCUMENTS

| | | |
|---|---|---|
| 4,624,897 A | 11/1986 | Ito |
| 5,804,306 A | 9/1998 | Sorenson et al. |
| 6,897,123 B2 | 5/2005 | Winther |
| 2011/0003077 A1 | 1/2011 | Heng et al. |
| 2014/0086670 A1* | 3/2014 | Ohkuni .............. B23K 35/0233 403/272 |

OTHER PUBLICATIONS

European Search Report issued in European Patent Application No. 15188581.1 dated Apr. 25, 2016.
Extended European Search Report issued in European Patent Application No. 15188581.1 dated May 3, 2016.

* cited by examiner

BONDING DISSIMILAR CERAMIC COMPONENTS

TECHNICAL FIELD

This disclosure generally relates to adhesive compositions and methods for creating bonds to join dissimilar ceramic components together.

BACKGROUND

Ceramic materials are well known for their excellent mechanical properties and stability at high temperature and have been widely used as ideal high temperature structural materials in many fields, including in the aeronautic fields. Permanent bonding between dissimilar materials to form hermetic seals is required in many products and components. Particularly stringent requirements are found in the manufacture of weapon systems, and more specifically with missile flight systems. However, although such ceramic materials exhibit desirable properties they may also exhibit brittleness that can restrict their application in fabricating structures, especially those structures with large dimensions and complex shapes. Thus, joining of ceramic components and especially dissimilar ceramic components can present challenges. Traditional joining or bonding technologies like mechanical connection, diffusion bonding and brazing are used for ceramic-to-ceramic connections, however, each of these known techniques have drawbacks.

In situations where the two materials have dissimilar thermal expansion coefficients, temperature fluctuations may induce fractures or permanent deformation that either cause the two different materials to break apart or shift in position relative to each other. The temperature changes can reflect cooling from the processing temperature at which the parts were bonded or from temperature cycles during the lifetime of the product containing the bonded components. Attempts to avoid the challenges of bonding dissimilar ceramic components have included, trying to select materials such that the mismatch of the different coefficients of thermal expansion (CTE) are minimized, performing bonding at the lowest possible temperature to avoid residual forces that can be locked in during cooling, minimizing the bonding area, use of a compliant layer that will absorb some of the thermal mismatch, incorporation of a multi-layer bonding system where each layer provides a gradual step change in the mismatched CTE, and even product design changes in an attempt to place the bond areas in locations of minimal relative movement of the joined parts.

Although there has been limited success with known methods of bonding ceramic components, challenges still exist in bonding dissimilar ceramic components, especially those components with different CTEs. For example, the known bonding methods can place severe restrictions on the materials that can be joined, use curing temperatures that are lower than thermal cycle temperatures experienced by the produced part, form low bond strength due to minimal bond area, cause shifting of bond layers due to thermal cycles, and involve high cost of multi-layer bonding techniques and/or design changes.

Accordingly, there is a need for improved adhesive compositions and bonding methods that avoid or minimize the issues associated with known bonding techniques and provides a cost effective solution to bonding dissimilar ceramic components.

SUMMARY

This disclosure provides adhesive compositions and methods for bonding ceramic components having different coefficients of thermal expansion using the adhesive compositions disclosed below. Bonding according to the present disclosure will allow ceramic components having differing CTEs to form a long lasting bond between the materials while overcoming the aforementioned problems of the current methods. The adhesives and bonding methods disclosed will also allow for the formation of hermetic seals between ceramic components having different CTEs.

One disclosed adhesive composition for use in bonding together a first component comprising a ceramic having a first coefficient of thermal expansion with a second ceramic component having a second coefficient of thermal expansion that is different than the first coefficient of thermal expansion, contains a particulate having the same chemical composition as the first ceramic component, a fluxing agent, and a low flux material. The adhesive is characterized in that application of heat to a layer of the adhesive that is in contact with bonding surfaces of the first and second components causes chemical composition changes to the bonding surfaces resulting in a formed bond between the first and second components.

The adhesive can also include water and a thickening agent to aid in the application of adhesive to one or more bonding surfaces and to achieve a desired resultant bond thickness between the first and second components.

A method of joining ceramic materials having differing coefficients of thermal expansion includes the steps of providing a first component having a first bonding surface and a second component comprising a ceramic having a second bonding surface, applying an adhesive to one or both of the first and second bonding surfaces to form a bond layer, where the adhesive comprises particulate having the same composition as one of the first or second components, a fluxing agent, and a low flux material. Once the adhesive is applied, the first and second bonding surfaces are joined with the bond layer and pressure is applied to one or both of the first and second components in a direction perpendicular to the adhesive layer to form an adhered composite. An initial heat of about 300° F. maximum temperature is applied on the joined adhered composite to drive off any moisture and/or other volatile components from the adhesive mixture, while establishing sufficient green strength to keep the joined components adhered to one another. A final heating step is used to cause chemical compositional changes to the adhesive and at least one of the substrates. Final heating of the adhered composite is accomplished through a step temperature profile starting at about 450° F. for at least 30 minutes, and finishing at a minimum of about 2,000° F. for 30 minutes.

The method can also include an adhesive formulation step where water, a chemically modified cellulose thickening agent, lithium metaborate, and zirconium oxide, and particulate having the same composition as the first component are mixed to form a homogenous admixture.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

DETAILED DESCRIPTION

Figure 1:
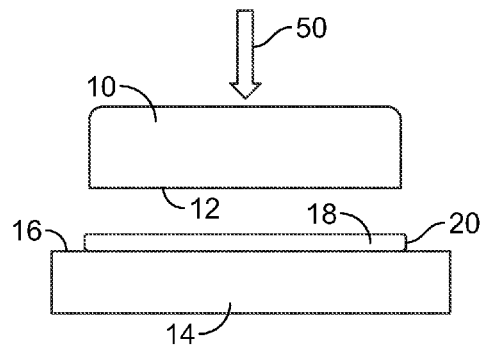
FIG. 1 is a schematic illustration of the adhesive of this disclosure applied as a layer on a bonding surface of a second component prior to contact with the bonding surface of a first component.

Joining two components of ceramic materials having different coefficients of thermal expansion (CTE) starts with knowing the chemical composition of each component. FIG. 1 schematically illustrates that a first ceramic component 10 is to be joined to a second ceramic component 14. The ceramic components can include traditional ceramic materials, defined as inorganic, nonmetallic solids prepared by the action of heat and subsequent cooling. These ceramic materials may have a crystalline or partly crystalline structure, or may be amorphous (e.g., a glass). As used herein the term ceramics also can include ceramic matrix composites (CMC), which are a subgroup of composite materials as well as a subgroup of technical ceramics. They consist of ceramic fibers embedded in a ceramic matrix, thus forming a ceramic fiber reinforced ceramic (CFRC) material. The matrix and fibers can consist of any ceramic material, whereby carbon and carbon fibers can also be considered a ceramic material. Also included in the term ceramics are metal matrix ceramics (MMC), sometimes referred to as "metaloceramics" that typically comprise about 60% metal alloy (aluminum, magnesium and/or titanium) and 40% traditional ceramics (typically $Al_2O_3$). These MMCs are characterized in that they are non-porous, machinable and can withstand high temperatures that typical traditional ceramics cannot.

The two ceramic components 10 and 14 illustrated in FIG. 1 could include respectively, a MMC, such as an alumina containing silicon carbide whiskers and a CMC, such as, a glass coated CMC. For example, the glass coating ceramic component 14 could comprise a specialty glass containing $SiO_2$, CaO and $Al_2O_3$. One such glass is VIOX 2936 manufactured and sold by Ceradyne, Inc. Each of the ceramic components 10 and 14 also have a bonding surface 12 and 16. These bonding surfaces are typically bonded as received with no surface treatment. One advantage of the adhesive and method of bonding disclosed here is that an intermediate layer comprising a solid sheet of material sandwiched between the two ceramic composites is not needed. Only a homogenous adhesive is required.

The adhesive layer 18 can be applied to either bonding surface 12 or 16, or both. First, however, the adhesive is prepared by starting with particulate that has the same chemical composition of one of the ceramic components 12 or 14. One way to obtain the particulate is to take a portion of one of the ceramic components and to grind the sample portion to a desired particle size. Grinding to a particle size of from about 200 mesh to about 325 mesh will allow uniform distribution with the other constituents of the adhesive. Grinding can be accomplished in a number of ways, for example, when only small amounts of adhesives are needed then a standard mortar and pestle can be used. For larger amounts of needed adhesive, automated mechanical grinders can be used. Ground particles from each ceramic component can also be used to prepare the particulate constituent of the adhesive. The total amount of particulate used in the final adhesive formulation is preferably determined to approximate or match the density and CTE of the base material. Typically, the particulate is in the range of from about 20 wt. % to about 75 wt. % of the adhesive. The adhesive also contains a fluxing agent and a low flux material.

The fluxing agent includes one or more of the following known fluxing agents, lithium metaborate, sodium carbonate, boron carbide, high borate glass, lime, alkaline ash and/or a mixture of these agents. These fluxing agents lower the melting point or softening temperature of the chemical matrix located at the bonding surfaces of the ceramic components to be bonded. The fluxing agents interact with the surface molecular structure of the bonding surfaces and pull them away (dissolve them) molecule-by-molecule. The fluxing agent can be ground to about the same size as the particulate. The total amount of fluxing agent used in the final adhesive formulation is in the range of from about 25 wt. % to about 80 wt. %.

The low flux material is selected such that it does not exhibit flux behavior at the fired temperature used to form the bond between substrates when using a specific adhesive formulation. In some cases a material that exhibits non-flux properties, used in the adhesive composition can be selected from the group comprising zirconia oxide, silicon nitride, silicon carbide, aluminates, silicates, alumino-silicates, titanates, zirconates, and any mixture of these materials to obtain the proper melting temperature and/or CTE gradient. Other nitride and carbide containing compounds can be used provided they exhibit non-flux properties can be used in addition to those listed above. The low flux material provides a structural network for the bond ultimately formed from the adhesive. Additionally, the presence of the low flux material provides strength, a CTE gradient between the bonded materials, thermal stability and porosity. Again, the particle size of the low flux material should be generally about the same size as the particulate and fluxing agent. The total amount of low flux material used in the final adhesive formulation is in the range of from about 20 wt. % to about 75 wt. %.

Also advantageous for use in preparing the adhesive is to include a chemically modified cellulose, known as cellulose ethers. Water as well can be used to wet the modified cellulose. These modified cellulose materials function as stabilizers, thickeners and viscosity agents and are comprised of organic polymers comprising polysaccharides that eventually volatize during the bond curing heat treatment. The modified cellulose thickens the adhesive mixture by increasing the viscosity, thus allowing a desired thickness of the adhesive layer 20 to be achieved, and ultimately, determining the final bond thickness of the finished bonded composite. The modified cellulose also provides a limited amount of bond strength of the adhesive to adhere the components together before heat treatment to form the final bond 26. One particular useful modified cellulose is methyl cellulose or Methocel™ manufactured and sold by Dow Chemical. However, other organic thickening agents could be used provided they readily burn out at the calcination temperatures used, for example, ethyl cellulose, cellulose, flours, grains or wood. These materials could be either synthetic or natural or mixtures of both. The total amount of modified cellulose used in the final adhesive formulation is in the range of from about 0 wt. % to about 20 wt. %. Water, preferably cold di-ionized water, can be added to the adhesive admixture to achieve the desired viscosity necessary to apply the adhesive to one or both ceramic components 10 and 14. The desired adhesive layer thickness is dependent on a number of variables with one criteria being that it is desired to have a very thin bond width or bondline on the resultant final adhered composite after the second heat treatment. Preferably the amount of adhesive applied to one or both components will result in a layer of adhesive having a thickness of less than 1 mil, or 0.001 inches, especially if the materials to be bonded have similar CTE properties. When there is a greater difference in the CTE properties, the layer of adhesive will generally be thicker.

Once the adhesive admixture is prepared an adhesive layer 18 can be applied to one or both of the bonding surfaces 12 and 16 to a desired thickness 20 in accordance with the criteria mentioned above. The thickness of the adhesive layer is a function of physical size necessity, porosity of the materials being joined, and the CTE difference between the two materials. The two bonding surfaces 12 and 16 of the ceramic components 10 and 14, respectively, are joined, or mated, together and a pressure force is applied perpendicular to the adhesive layer. For example in FIG. 1 this direction is illustrated by directional arrow 50. Of course, the pressure force could be directed in the opposite direction against ceramic component 14 or the pressure could be applied against both ceramic components. The amount of pressure and the time the pressure is applied is sufficient to adhere the first and second components together for handling purposes, particularly for transport to and placement in a curing apparatus such as an oven, kiln, calciner, autoclave or similar heating apparatus. Pressure is preferably applied with enough force to maintain a minimum adhesive layer thickness while minimizing the possibility of the two joined ceramic components 10 and 14 shifting relative to each other.

Figure 2:
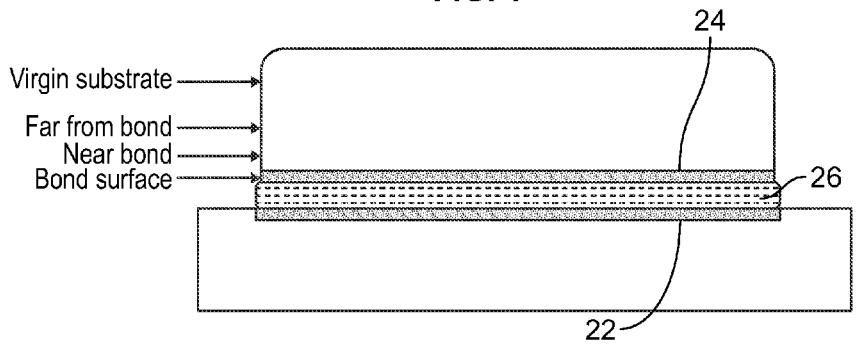
FIG. 2 is a schematic illustration of the bonded components of FIG. 1 showing that the bonding surfaces of at least one component has changed in chemical composition.

FIG. 2 schematically illustrates the formed bonded composite of ceramic components 10 and 14 having a formed bond 26. This formed composite is obtained after the adhered first and second components 10, 14 as illustrated in FIG. 1 are first heat treated to a temperature of from about ambient room temperature to about 800° F. for about 30 minutes and then the furnace is allowed to cool to room temperature at its own rate. During this first heat treatment or drying phase, solvents are removed from the adhesive formulation and the required green strength is established between component 10 and component 12. The term "green strength" as used herein describes the bond strength before the joined and adhered composite is subjected to the final heating step at a temperature starting at about 450° F. for at least 30 minutes, and finishing at a minimum of about 2,000° F. for 30 minutes. This final heating step results in formation of final bond strength. The first or initial heating of the adhered composite causes moisture and/or other volatile components (solvents, organic materials, etc.) to be driven off from the adhesive layer between the substrates to establish green strength of the bond layer. Once green strength is achieved, the adhered composite can be handled without distortion, damage, separation, delamination, alteration, or other physical changes to the adhered composite.

The adhered composite is then subjected to a second heat treatment. This second heat treat, referred to as firing or curing of the adhered composite composite is accomplished through a step temperature profile starting at about 450° F. for at least 30 minutes, and finishing at a minimum of about 2,000° F. for 30 minutes. This curing step causes the fluxing agent to lower the melting point of one or both of the materials that are joined, without either of the materials completely losing their structural form. As the adhesive layer 18 is cured to form bond 26, the adhesive can transform one or both of the bonding surfaces 12 and 16 into surfaces 22 and 24. These surfaces are transformed such that the chemical make-up of one or more of the bonded/joined materials exhibits a transitional chemical gradient between the bonded surfaces. For example, when a SiC—Al2O3 material is bonded to a glass CMC surface, the high concentration of SiC body transitions into a lower C content as it approaches the bond area due to the high temperature of the curing/calcination step, the release of free carbon and the increase in creation of SiO2. A gradual increase in the concentration of the flux agents, such as Li and B, are also observed. Using Electron Spectroscopy Chemical Analysis (ESCA) these transitional chemical gradients can be measured thus evidencing that one or more of the bonding surfaces have chemically changed when compared to the chemical make-up of the virgin substrate materials being bonded together.

EXAMPLE

Laboratory sized samples of two different substrate materials were bonded together using the following procedure. Lithium metaborate, zirconium oxide and frit were ground using a bench mortar and pestle to further reduce particle size of the powdered constituents to a uniform size and to achieve a homogenous mixture. Small amounts of de-ionized water were added drop-wise into the ground powders for wetting purposes and to hydrolyze the surface. Methocel™ was added to the wetted powder formulation as thickening agent to tailor viscosity of the resultant adhesive mixture to achieve a desired bondline. The adhesive had the following composition: lithium metaborate—55.6 wt. %; zirconium oxide—5.6 wt. %; frit (Viox 2936)—38.9 wt. %; di-ionized water plus Methocel™ to achieve desired viscosity.

A thin layer of the adhesive mixture was spread across the surface of a first substrate comprising alumina with silicon carbide whiskers (designated Substrate 1). A second substrate comprising a plate of glass coated Ceramic Matrix Component (CMC) (designated Substrate 2) was placed on the adhesive layer and pressure was applied to distribute the adhesive uniformly between the two bonding surfaces and to ensure full contact of both surfaces of the two substrates with the adhesive layer. The joined substrates were then subjected to a two step heat treatment as follows: A first heating in a furnace to a temperature of from about ambient room temperature to about 800° F. and then a hold at the maximum temperature for about 30 minutes. Allowing the furnace to cool to room temperature at its own rate. The second heat treatment was accomplished through a step temperature profile starting at about 450° F. for at least 30 minutes, and finishing at a minimum of about 2,000° F. for 30 minutes. After cooling it was observed that the two substrates were securely bonded together.

Figure 3:
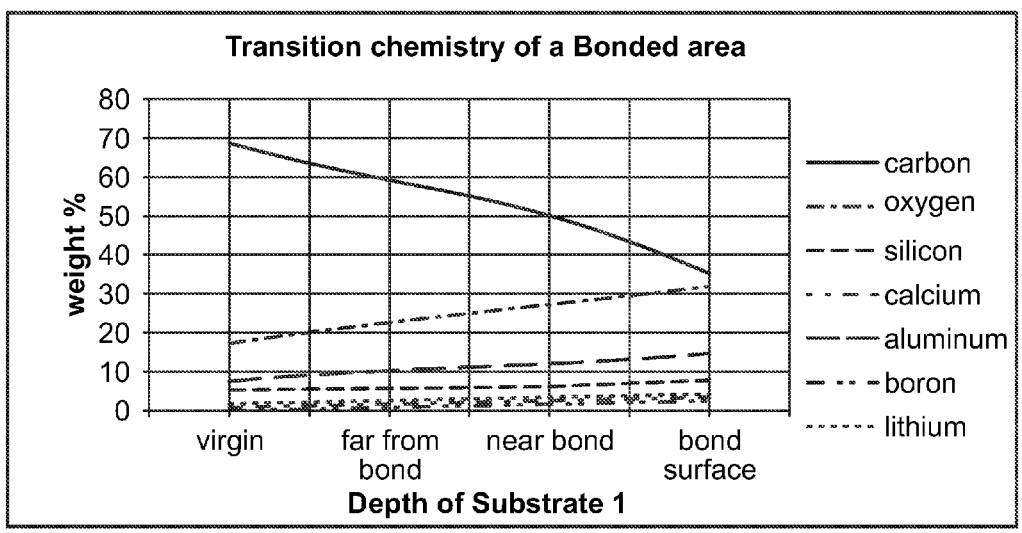
FIG. 3 is a graphical representation of data obtained from ESCA analysis of a bonded substrate.

Analysis of resultant bonded substrate was conducted using ESCA to determine if the chemistry of first substrate, Substrate 1, had changed as a result of the bonding procedure. The ESCA analysis is shown in FIG. 3. The sample profile locations are graphically illustrate in FIG. 2. The above ESCA analytical results demonstrates the change in chemistry from the virgin area of the first substrate to the bonded surface indicating that the substrate underwent a chemical change in the dense material that is usually very hard to bond.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. An adhesive comprising,
a) a particulate selected from one or more of glass coated ceramic matrix composites and metal matrix ceramics;
b) a fluxing agent;
c) a low flux material;
d) water; and
e) a thickening agent.

2. The adhesive of claim 1 where the fluxing agent comprises lithium metaborate.

3. The adhesive of claim 1 where the low flux material comprises zirconium oxide.

4. The adhesive of claim 1 where the thickening agent comprises chemically modified cellulose.

5. The adhesive of claim 1 wherein the fluxing agent is selected from one or more of lithium metaborate, sodium carbonate, boron carbide, high borate glass, lime and alkaline ash.

6. The adhesive of claim 1 wherein the low flux material is selected from one or more of zirconium oxide, silicon nitride, silicon carbide, aluminates, silicates, alumino-silicates, titanates, and zirconates.

7. The adhesive of claim 1 wherein the adhesive is an admixture of water, a chemically modified cellulose thickening agent, lithium metaborate, zirconium oxide, and the particulate.

8. The adhesive of claim 1 including from about 20 wt % to about 75 wt % of the particulate, from about 25 wt % to about 80 wt % of the fluxing agent and from about 20 wt % to about 75 wt % of the low flux material.

9. An adhesive comprising,
a) a particulate selected from one or more of ceramic matrix composites and metal matrix ceramics;
b) a fluxing agent; and
c) a low flux material,
wherein heating the adhesive when in contact with a ceramic results in a chemical composition change in the ceramic.

10. An adhesive comprising,
a) a particulate selected from one or more of ceramic matrix composites and metal matrix ceramics;
b) a fluxing agent; and
c) a low flux material, and
wherein the adhesive is capable of causing a change in the chemical composition of a ceramic when the ceramic is in contact with the adhesive.

11. An adhesive comprising,
a) a particulate selected from one or more of glass coated ceramic matrix composites and metal matrix ceramics;
b) a fluxing agent selected from sodium carbonate, high borate glass, lime and alkaline ash;
c) a low flux material;
d) water; and
e) a thickening agent.

12. An adhesive comprising,
a) a particulate selected from one or more of glass coated ceramic matrix composites and metal matrix ceramics;
b) a fluxing agent;
c) a low flux material selected from one or more of aluminates, silicates, alumino-silicates, titanates, and zirconates;
d) water; and
e) a thickening agent.

* * * * *